(12) United States Patent
Perset

(10) Patent No.: US 6,394,045 B1
(45) Date of Patent: May 28, 2002

(54) DEVICE FOR REGULATING THE COOLING OF A MOTOR-VEHICLE INTERNAL-COMBUSTION ENGINE

(75) Inventor: Denis Perset, Paris (FR)

(73) Assignee: Valeo Thermique Moteur, La Verriere (FR)

( * ) Notice: Subject to any disclaimer, the term of this patent is extended or adjusted under 35 U.S.C. 154(b) by 0 days.

(21) Appl. No.: 09/628,505

(22) Filed: Jul. 28, 2000

(30) Foreign Application Priority Data

Jun. 30, 1999 (FR) .............................. 99 09953

(51) Int. Cl.$^7$ ................................. F01P 5/10
(52) U.S. Cl. ................. 123/41.44; 123/41.49
(58) Field of Search ............. 123/41.44, 41.12, 123/41.49

(56) References Cited

U.S. PATENT DOCUMENTS 4,475,485 A * 10/1984 Sakakibara et al. ...... 123/41.05
4,768,484 A    9/1988 Scarselletta
5,036,803 A * 8/1991 Nolting et al. ............. 123/41.1
5,724,924 A    3/1998 Michels
6,032,618 A * 3/2000 Ferrari et al. ............. 123/41.1

FOREIGN PATENT DOCUMENTS

EP    0557113 A    8/1993
EP    0894954 A    2/1999

* cited by examiner

*Primary Examiner*—Tony M. Argenbright
*Assistant Examiner*—Katrina B. Harris
(74) *Attorney, Agent, or Firm*—Liniak, Berenato, Longacre & White

(57) ABSTRACT

A device for regulating the cooling of a motor-vehicle internal-combustion engine has a fluid-cooling circuit coupled to a fluid pump feeding an installation for heating and/or air conditioning the passenger compartment of the vehicle, with adjustable air-heating parameters, including an air heater. It also has a device for establishing an engine-starting state on the basis of chosen conditions and a device which acts in this starting state for either stopping the pump if the heating demand is below a certain threshold or else for driving the pump as a function of a saturation rotational speed.

18 Claims, 2 Drawing Sheets

DEVICE FOR REGULATING THE COOLING OF A MOTOR-VEHICLE INTERNAL-COMBUSTION ENGINE

FIELD OF THE INVENTION

The invention relates to the internal-combustion engines of motor vehicles, and it more particularly concerns a device for regulating the cooling of such an internal-combustion engine.

BACKGROUND OF THE INVENTION

In present-day motor vehicles with an internal-combustion engine, the cooling device comprises a cooling circuit traversed by a fluid, which is generally water with the addition of antifreeze. The circuit is coupled to a fluid pump in order to cool the internal-combustion engine the operation of which is defined at any moment by a prevailing load and a rotational speed. Moreover, this cooling circuit feeds an installation for heating and/or air conditioning the passenger compartment of the vehicle, with adjustable air-heating parameters, including an air heater.

The fluid pump is usually driven mechanically by the crankshaft of the engine, such that the throughput of the pump depends directly on the rotational speed of the engine. It results therefrom that the energy which is taken up by the pump from the engine shaft is not optimised. In fact, this energy is generally very much greater than that required. Consequently, on the one hand, energy from the engine is consumed needlessly, resulting in an over-consumption of fuel, and, on the other hand, the engine, and particularly the oil of its oil circuit, is overcooled, resulting in an increase in friction and consequently a lowering of the efficiency of the engine.

An object of the invention is to at least partly mitigate these drawbacks.

SUMMARY OF THE INVENTION

According to the present invention there is provided a device for regulating the cooling of a motor-vehicle internal-combustion engine, of the type comprising a fluid-cooling circuit coupled to a fluid pump for cooling the said internal-combustion engine the operation of which is defined at any moment by a prevailing load and a rotational speed, the said circuit feeding an installation for heating and/or air conditioning the passenger compartment of the vehicle, with adjustable air-heating parameters, including an air heater, the device further comprising:

means for establishing an engine-starting state on the basis of chosen conditions; and
means which are active in this starting state so as, depending on a quantity representative of the heating demand and on at least one other quantity,
either to stop the pump if the heating demand is below a certain threshold,
or else to drive the pump as a function of a saturation rotational speed.

Thus, the invention envisages regulating the cooling of the internal-combustion engine in an engine-starting state, which corresponds to a phase in which the engine is cold, also called start-up phase.

Hence, the device of the invention first of all determines whether the engine is in its starting state and, if so, it stops or drives the pump as a function of a quantity representative of the heating demand, and of at least one other quantity.

It results therefrom that the device calculates the minimum throughput of the pump which is necessary for the engine to be cooled at the instant of the calculation. It is thus also possible optimally to regulate the throughput of the pump, and consequently the cooling of the engine, during this starting state.

The device according to the invention may comprise other complementary characteristics capable of being taken separately or in combination, and especially:

the means for establishing the engine-starting state comprise means for detecting the operation of the engine and means for measuring or estimating a temperature representative of the thermal state of the engine and comparing it with a given threshold, so as to establish the starting state when this temperature is below this threshold;

the means for detecting the operation of the engine comprise a sensor for detecting whether the contact of the engine is open and a sensor for detecting whether the rotational speed of the engine exceeds a given threshold;

the temperature representative of the thermal state of the engine is a temperature of the material of the engine;

the temperature representative of the thermal state of the engine is a temperature of the fluid leaving the engine;

the temperature representative of the thermal state of the engine is a temperature of the fluid in the engine;

the temperature representative of the thermal state of the engine is a temperature of the lubricating oil of the engine;

the quantity representative of the heating demand is a heating position defined by a value in terms of a percentage of the maximum heating demand, and the active means moreover receive a quantity representative of a temperature discrepancy between the temperature of the fluid leaving the engine and the temperature of the ambient air;

the active means comprise control means suitable for stopping or driving the pump as follows:
if the heating demand is zero or below the threshold, then stopping the pump,
if the heating demand exceeds the threshold, then
if the temperature discrepancy is below a first threshold, stopping the pump;
if the temperature discrepancy is above the first threshold and below a second threshold, driving the pump by establishing the rotational speed of the pump at a value proportional to the saturation rotational speed which corresponds to the rotational speed of the pump making it possible to obtain a saturation throughput in the air heater;
if the temperature discrepancy is above the second threshold, then driving the pump by establishing the rotational speed of the pump at a value equal to the saturation rotational speed;

the other condition is related to a temperature of a material representative of the thermal state of the engine;

in the case in which the material temperature is available, the device comprises comparison means for comparing the material temperature with a given threshold, and
if the material temperature is below this threshold, then for activating the said active means,
if the material temperature is above this threshold, then for de-activating the said active means and establishing the pump rotational speed just at a value necessary for the correct operation of the engine, having regard to the prevailing load and the rotational speed of the engine;

in the event that the material temperature is unavailable, the device comprises estimating means for estimating this material temperature;

these estimating means are chosen from among:

an internal-combustion engine model which calculates the material temperature as a function of an engine rotational-speed and engine-load log, a table of correlation between the temperature of the lubricating oil of the engine and the material temperature, and a table of correlation between the temperature of the fluid leaving the engine and the material temperature;

in the event that the material temperature is unavailable, the device comprises means such that, as soon as the rotational speed of the engine has exceeded a given threshold, the pump is stopped for a fixed period, then operates at a minimum throughput as long as the temperature of the fluid leaving the engine is below a given threshold; and in the event that the material temperature is unavailable, the device comprises means such that, as soon as the rotational speed of the engine has exceeded a given threshold, the pump operates at a minimum throughput as long as the temperature of the fluid leaving the engine is below a fixed threshold.

BRIEF DESCRIPTION OF THE DRAWINGS

In the description which follows, given solely by way of example, reference is made to the attached drawings, in which.

DESCRIPTION OF THE PREFERRED EMBODIMENTS

Figure 1:
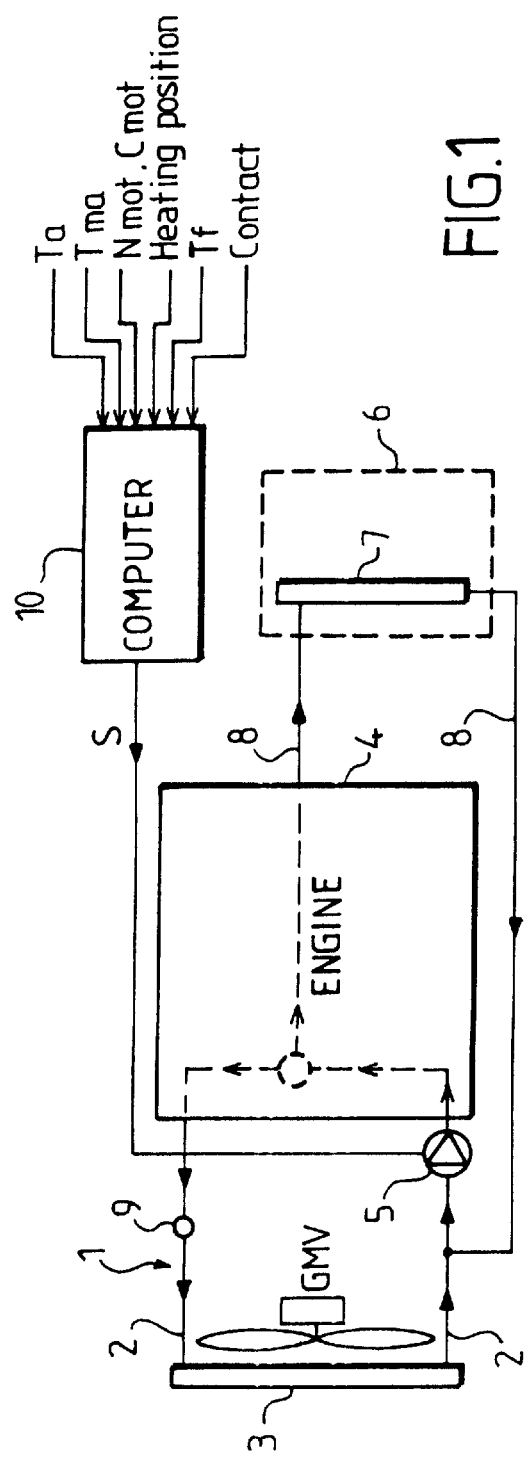
FIG. 1 is a diagram illustrating an internal-combustion engine coupled to an installation for heating a vehicle passenger compartment, as well as to an embodiment of a cooling device according to the invention.

In the various figures, like reference numerals refer to like parts.

Reference will first of all be made to FIG. 1, in order to describe an embodiment of a cooling device according to the invention, in relation to a cold engine, which corresponds to a starting state ED.

The cooling device first of all comprises a cooling circuit 1 including ducts 2 in which a cooling fluid circulates, for example water with the addition of antifreeze such as glycol. These ducts feed a cooling radiator 3 swept by an airflow resulting either from the movement of the vehicle or from the operation of a motor-driven fan unit GMV. A part of the cooling circuit 1 penetrates into the internal-combustion engine 4 of the vehicle in order to allow it to be cooled.

The circuit 1 furthermore includes a fluid pump 5 actuated by a motor, here an electric motor, and the throughput of which can be varied in such a way as to allow management of the throughput of the cooling fluid injected into the engine 4.

The cooling circuit 1 also preferably includes a controlled thermostat 9. In the example represented, the cooling circuit 1 is coupled to an installation 6 for heating the passenger compartment of the vehicle. This installation especially includes a heating radiator 7, also called "air heater", supplied via ducts 8 which are mounted as a diversion from the cooling circuit 1.

The throughput of the fluid pump 5 is managed with the aid of a signal S supplied by a control module 10 which can be produced, for example, in the form of a microprocessor, or of an ASIC. It takes the form in fact of a computer which, as a function of parameters which will be specified, determines the value of the minimum throughput of the pump (called optimal throughput), just necessary for the engine to be cooled with regard to its prevailing operating point and to other parameters.

The operating point of the engine is understood here to be, on the one hand, its rotational speed (represented by the variable Nmot), and, on the other hand, its load (represented by the variable Cmot).

For an engine to operate at its maximum efficiency, it has to be at a temperature which depends especially on its operating point, and consequently on its rotational speed and on its load. If the temperature is too low, the temperature of the oil circuit which supplies the engine is not optimal, such that the fluidity of the oil does not allow the engine to operate at full efficiency. Moreover, that contributes to more rapid wearing of the components of the engine. Furthermore if the engine is not working at full efficiency, overconsumption of fuel is the result.

As will be seen, the device of the invention defines a strategy for driving the fluid pump which, as a function of certain input data, calculates a pump rotational speed to be applied. This rotational speed is designated here by Np. In the rest of the description, the starting hypothesis is that the ducts of the circuit which are connected to the air heater 7 include no regulation valve and that no account is taken of the management of the blower (not represented) which makes it possible to send the airflow having swept the air heater 7 into the passenger compartment.

In the example, the input data for the computer 10 (FIG. 1) are the measurements of the following values:

material temperature: Tma, ambient-air temperature: Ta, engine rotational speed: Nmot, load on the engine: Cmot, temperature of the fluid leaving the engine: Tf, and heating position: Dch.

The material temperature Tma is a temperature representative of the thermal state of the engine, for example a temperature in the region of a bridge between valves, a temperature of a plug seal, a temperature of the upper-cylinder metal, a temperature in the region of the cylinder head of the engine. This therefore assumes that this temperature is available via an appropriate sensor.

The temperature of the ambient air Ta is taken outside the vehicle by an appropriate sensor.

The engine rotational speed Nmot corresponds to the number of revolutions of the engine and is supplied, for example, by an injection computer.

The load on the engine Cmot is supplied, for example, by the position of the accelerator pedal, the position of a carburettor butterfly valve, etc.

The temperature of the fluid Tf leaving the engine is supplied by an appropriate temperature sensor.

The heating position Dch is defined by a value in terms of a percentage of the maximum heating demand.

This position can be supplied directly by a manual setting device or on the basis of the set-point temperature and of the temperature of the passenger compartment in the case of an automatic heating/air-conditioning apparatus.

Consequently, this heating position may lie between 0% (no heating demand) and 100% (maximum heating demand).

The computer 10 (FIG. 1) also receives an item of input data, called "contact", in order to supply a signal indicating whether the internal-combustion engine is operating. To do that, means are provided for detecting whether the contact of the engine is open. A sensor is moreover provided for detecting whether the engine rotational speed (Nmot) exceeds a given threshold, this threshold corresponding to an engine speed equal to 400 rpm, for example.

Figure 2:
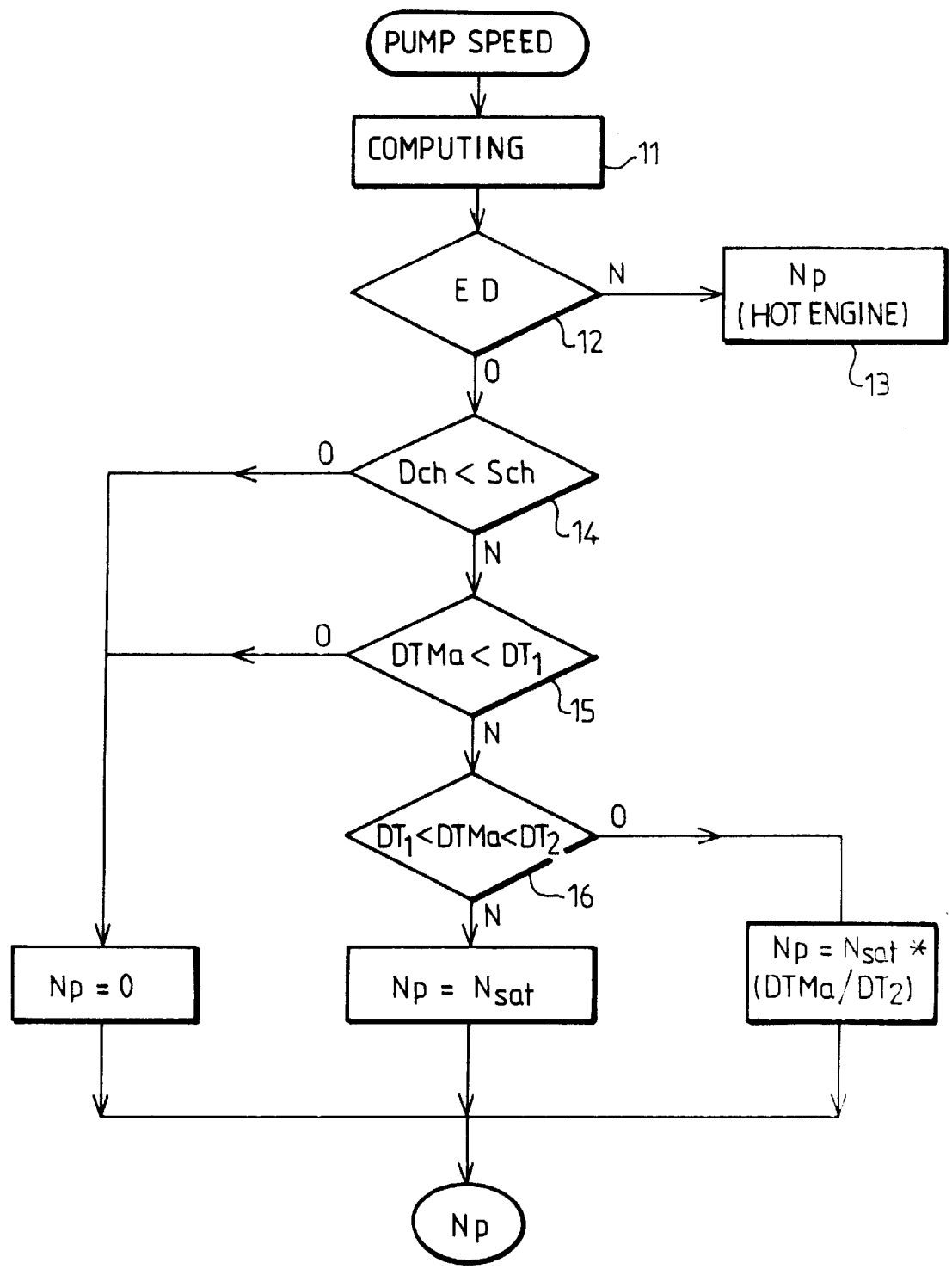
FIG. 2 is a flowchart of operation of the device in one embodiment.

Reference will now be made to the flowchart of FIG. 2 in order to describe the operation of the computer 10 which drives the fluid pump 5.

The computer 10 comprises calculating means 11 which, via a comparator 12, determine whether the engine is in the starting state ED. In order for this to be satisfied, the engine has to be running and its rotational speed has to exceed a given threshold, for example 400 rpm, as indicated above. If this comparison is negative, that is to say if it turns out that the engine is not in its starting state, the rotational speed of the pump Np is managed by other calculating means 13 which do not form part of the invention, and which relate to the operation of the engine in terms of rotational speed when hot.

The detection of the starting phase ED may be defined by one of the following criteria:

fluid temperature Tf below a threshold Tfs fixed according to the architecture of the engine, equal to 40° C., for example;

material temperature Tma below Tm1, where Tm1 is a threshold corresponding to the material temperature, lying between 110° C. and 130° C., for example;

oil temperature Th below Thl, where Thl is a threshold of the temperature of the oil, lying between 40° C. and 50° C., for example.

In what follows, it is assumed that the material temperature Tma is available and that the starting state is determined also by a material temperature threshold.

Hence, if Tma is below Tm1 the computer determines that the starting state ED applies.

The computer then takes into account the heating demand Dch and another parameter DTMa which corresponds to the temperature difference between the fluid and the ambient air, that is to say Tf−Ta.

A comparator 14 compares Dch and a threshold Sch of the heating demand. This threshold Sch may correspond, for example, to 5% of the maximum value of the heating demand.

If the heating demand Dch is equal to 0 or below the threshold Sch, then the computer sends a signal S which stops the fluid pump 5, which means that its rotational speed Np is equal to 0.

If the heating demand is above Sch (5%, for example), the computer compares the temperature discrepancy DTMa with two temperature thresholds, namely a first threshold, or lower threshold, DT1 and a second threshold, or upper threshold, DT2. These thresholds DT1 and DT2 may correspond respectively to 10° C. and 40° C., for example.

A comparator 15 compares DTMa and DT1. If DTMa is below DT1, then the computer stops the pump operating (Np=0).

If DTMa lies between DT1 and DT2, then the computer drives the pump in such a way that its rotational speed Np is proportional to a saturation rotational speed Nsat in accordance with the relationship NP=Nsat * (DTMa/DT2).

Figure 3:
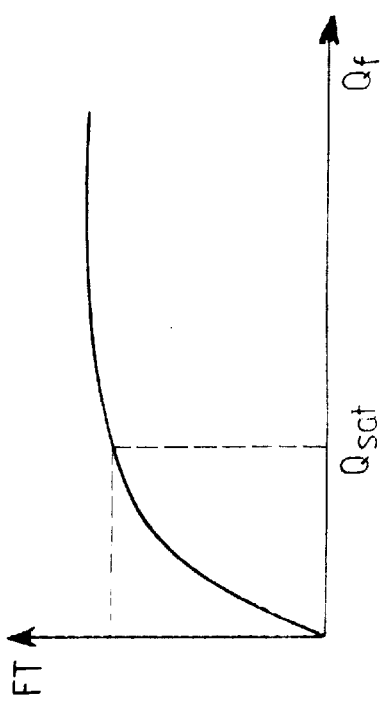
FIG. 3 is a curve illustrating the variations in the saturation throughput of a pump in an air heater of the heating installation.

Nsat is the rotational speed of the pump which makes it possible to obtain a saturation throughput in the air heater 7. This saturation throughput corresponds to the throughput of the fluid which makes it possible to obtain 90% of an asymptotic thermal flux for a given air throughput as shown in FIG. 3 which illustrates the variations in the thermal flux FT as a function of the throughput of fluid Qf, the saturation throughput being designated by Qsat.

In the case in which DTMa is higher than DT2, then the computer establishes the rotational speed of the pump in such a way that it corresponds to the saturation rotational speed, that is to say that then Np=Nsat.

The conditions indicated above corresponded to the case where Tma is below Tm1.

When Tma is above Tm1, then the conditions corresponding to the starting state have been left behind. The rotational speed of the pump Np is then established by other means which do not directly form part of the invention.

It is generally arranged for the rotational speed of the pump Np to be equal to the highest value corresponding to a pump rotational speed Nmini and a pump rotational speed Noptimal. Nmini here designates the rotational speed of the pump which makes it possible to obtain the throughput which is just necessary to cool the engine correctly and which depends on the operating point of the engine, that is to say on its rotational speed Nmot and on its load Cmot.

Noptimal designates the pump rotational speed which makes it possible to obtain the fluid throughput in the air heater which provides the best heating/consumption compromise for a given blower speed and a given heating requirement.

In the foregoing, it has been assumed that the material temperature Tma is available, for example from a sensor as indicated.

In certain cases, this material temperature is not directly available.

Three possibilities can then be envisaged.

In a first case, the computer supplies an estimated value of the material temperature, which then leads back to the preceding case. This estimate can be produced in three ways.

A first possibility consists in supplying an internal-combustion engine model which calculates the material temperature Tma as a function of an engine rotational speed (Nmot) and engine load (Cmot) log.

A second possibility is to establish a table of correlation between the temperature of the lubricating oil (Th) of the engine and the material temperature Tma.

A third possibility is to establish a table of correlation between the temperature of the fluid Tf leaving the engine and the material temperature Tma.

It is also possible to produce a time delay with zero and reduced throughputs.

In a variant, the device comprises means so that, as soon as the rotational speed of the engine has exceeded a given threshold (for example Nmot above 400 rpm), the pump is stopped for a fixed period. Next, the pump operates at the minimum throughput as long as the temperature of the fluid leaving the engine is below a fixed threshold, lying between 40 and 90° C., for example.

Another possibility is to produce a time delay with reduced throughputs. The device may then comprise means such that, as soon as the rotational speed of the engine has exceeded a given threshold (for example Nmot above 400 rpm), the pump operates at the minimum throughput as long as the temperature of the fluid leaving the engine is below a fixed threshold, lying between 40 and 90° C., for example.

Obviously the invention is not limited to the embodiments described above by way of example and extends to other variants.

What we claim is:

1. A device for regulating the cooling of a motor vehicle internal combustion engine, of a type comprising a fluid-cooling circuit coupled to a fluid pump for cooling the internal-combustion engine the operation of which is defined at any moment by a prevailing load and a rotational speed, the circuit feeding an installation for heating and/or air conditioning a passenger compartment of the vehicle, with adjustable air-heating parameters, including an air heater, the device further comprising:

determining means for establishing an engine-starting stating state on the basis of chosen conditions; and a control means for controlling the pump which is active in the starting state so as, depending on a quantity representative of the heating demand and on at least one other quantity, either to stop the pump if a heating demand is below a certain threshold, or else to drive the pump as a function of a saturation rotational speed.

2. The device of claim 1, wherein the means for establishing the engine-starting state comprise means for detecting the operation of the engine and means for measuring or estimating a temperature representative of the thermal state of the engine and comparing it with a given threshold, so as to establish the starting state when this temperature is below this threshold.

3. The device of claim 2, wherein the means for detecting the operation of the engine comprise a sensor for detecting whether the contact of the engine is open and a sensor for detecting whether the rotational speed of the engine exceeds a given threshold.

4. The device of claim 2, wherein the temperature representative of the thermal state of the engine is a temperature of the material of the engine.

5. The device of claim 2, wherein the temperature representative of the thermal state of the engine is a temperature of the fluid leaving the engine.

6. The device of claim 2, wherein the temperature representative of the thermal state of the engine is a temperature of the fluid in the engine.

7. The device of claim 2, wherein the temperature representative of the thermal state of the engine is a temperature of the lubricating oil of the engine.

8. The device of claim 1, wherein the quantity representative of the heating demand is a heating position defined by a value in terms of a percentage of the maximum heating demand, and in that the control means moreover receive a quantity representative of a temperature discrepancy between the temperature of the fluid leaving the engine and the temperature of the ambient air.

9. The device of claim 8, wherein the control means operates as follows:

if the heating demand is zero or below the threshold, then stopping the pump, if the heating demand exceeds the said threshold, then if the temperature discrepancy is below a first threshold, then stopping the pump;

if the temperature discrepancy is above the first threshold and below a second threshold, then driving the pump by establishing the rotational speed of the pump at a value proportional to the saturation rotational speed which corresponds to the rotational speed of the pump making it possible to obtain a saturation throughput in the air heater, as defined by the relationsip:

$$Np = Nsat*(DTMa/DT2),$$

where Np is the rotational speed of the pump; DTMa is the said temperature discrepancy and DT2 is the said second threshold if the temperature discrepancy is above the second threshold, then driving the pump by establishing the rotational speed of the pump at a value equal to the saturation rotational speed.

10. The device of claim 1, wherein the said other condition is related to a temperature of a material representative of the thermal state of the engine.

11. The device of claim 10, wherein, in the case in which the material temperature is available, the device comprises comparison means for comparing the material temperature with a threshold temperature, and if the material temperature is below this threshold, then for activating the said active means, if the material temperature is above this threshold, then for de-activating the said active means and establishing the pump rotational speed just at a value necessary for the correct cooling of the engine, having regard to the prevailing load and the rotational speed of the engine.

12. The device of claim 10, wherein, in the event that the material temperature is unavailable, the device comprises estimating means for estimating this material temperature.

13. The device of claim 12, wherein the estimating means are chosen from among:

an internal-combustion engine model which calculates the material temperature as a function of an engine rotational-speed and engine-load log, a table of correlation between the temperature of the lubricating oil of the engine and the material temperature, and a table of correlation between the temperature of the fluid leaving the engine and the material temperature.

14. The device of claim 10, wherein in the event that the material temperature is unavailable, the control means operates such that, as soon as the rotational speed of the engine has exceeded a given threshold, the pump is stopped for a fixed period, then operates at a minimum throughput as long as the temperature of the fluid leaving the engine is below a given threshold.

15. The device of claim 10, wherein, in the event that the material temperature is unavailable, the control means operates such that, as soon as the rotational speed of the engine has exceeded a given threshold, the pump operates at a minimum through put as long as the temperature of the fluid leaving the engine is below a fixed threshold.

16. A method for regulating the cooling of a motor vehicle internal combustion engine, of a type comprising a fluid-cooling circuit coupled to a fluid pump for cooling the internal-combustion engine the operation of which is defined at any moment by a prevailing load and a rotational speed, the circuit feeding an installation for heating and/or air conditioning a passenger compartment of the vehicle, with adjustable air-heating parameters, including an air heater, the method comprising the following steps:

determining if the internal combustion engine is in an engine-starting stating state; and if said engine starting state is determined, controlling the pump which is active in the engine starting state so as, depending on a quantity representative of a heating demand and an additional quantity.

17. The method according to claim 16, wherein said step of controlling the pump further includes a step of determining a discrepancy between a temperature of a fluid leaving the internal combustion engine an a temperature of ambient air, said step of controlling said pump being dependent upon said discrepancy.

18. The method according to claim 16, wherein the step of controlling the pump operates according to the following parameters:

if the heating demand is zero or below a threshold, then the pump is stopped, if the heating demand exceeds the said threshold, then
if the temperature discrepancy is below a first threshold, then stopping the pump;
if the temperature discrepancy is above the first threshold and below a second threshold, then driving the pump by establishing the rotational speed of the pump at a value proportional to the saturation rotational speed which corresponds to the rotational speed of the pump making it possible to obtain a saturation throughput in the air heater, as defined by the relationship:

$$Np = Nsat * (DTMa/DT2),$$

where Np is the rotational speed of the pump; DTMa is the said temperature discrepancy and DT2 is the said second threshold if the temperature discrepancy is above the second threshold, then driving the pump by establishing the rotational speed of the pump at a value equal to the saturation rotational speed.

* * * * *